United States Patent
Ma et al.

[11] Patent Number: 5,920,725
[45] Date of Patent: Jul. 6, 1999

[54] RUN-TIME OBJECT-SYNTHESIS AND TRANSPARENT CLIENT/SERVER UPDATING OF DISTRIBUTED OBJECTS USING A META SERVER OF ALL OBJECT DESCRIPTORS

[75] Inventors: Henry Chi-To Ma, Redwood City; George C. Lo, Fremont, both of Calif.

[73] Assignee: Adaptivity Inc., San Mateo, Calif.

[21] Appl. No.: 08/887,354

[22] Filed: Jul. 2, 1997

[51] Int. Cl.6 .................................................. G06F 9/445
[52] U.S. Cl. .................................... 395/712; 707/203
[58] Field of Search .............................. 395/712, 200.32, 395/200.33, 200.51, 200.57, 682, 186, 684, 185.1, 706, 683, 670; 707/103, 203, 2, 10; 711/145

[56] References Cited

U.S. PATENT DOCUMENTS

| | | | |
|---|---|---|---|
| 5,297,279 | 3/1994 | Bannon et al. | 395/600 |
| 5,339,419 | 8/1994 | Chan et al. | 395/707 |
| 5,339,438 | 8/1994 | Conner et al. | 395/705 |
| 5,369,766 | 11/1994 | Nakano et al. | 395/685 |
| 5,410,688 | 4/1995 | Williams et al. | 707/10 |
| 5,437,027 | 7/1995 | Bannon et al. | 395/600 |
| 5,461,714 | 10/1995 | Honiden et al. | 704/258 |
| 5,475,817 | 12/1995 | Waldo et al. | 395/683 |
| 5,497,463 | 3/1996 | Stein et al. | 395/200.33 |
| 5,499,343 | 3/1996 | Pettus | 395/200.33 |
| 5,511,197 | 4/1996 | Hill et al. | 395/700 |
| 5,519,866 | 5/1996 | Lawrence et al. | 395/710 |
| 5,522,077 | 5/1996 | Cuthbert et al. | 395/683 |
| 5,542,078 | 7/1996 | Martel et al. | 707/101 |
| 5,548,723 | 8/1996 | Pettus | 395/200.58 |
| 5,555,427 | 9/1996 | Aoe et al. | 395/200.31 |
| 5,581,758 | 12/1996 | Burnett et al. | 707/103 |
| 5,584,035 | 12/1996 | Duggan et al. | 345/339 |
| 5,590,331 | 12/1996 | Lewis et al. | 395/708 |
| 5,692,183 | 11/1997 | Hapner et al. | 395/614 |
| 5,734,898 | 3/1998 | He | 395/619 |
| 5,778,227 | 7/1998 | Jordan | 395/682 |
| 5,787,413 | 7/1998 | Kauffman et al. | 707/2 |
| 5,790,796 | 8/1998 | Sadowsky | 395/200.51 |
| 5,793,965 | 8/1998 | Vanderbilt et al. | 395/200.33 |

OTHER PUBLICATIONS

The Gemstone Object Database Management System, Butterworth et al., Communications of the ACM, Oct. 1991/vol. 34, No. 10.

Seltzer, "Future Distributed Computing", PC Mag. Mar. 25, 1997, pp. 198–204.

*Primary Examiner*—James P. Trammell
*Assistant Examiner*—Antony Nguyen-Ba
*Attorney, Agent, or Firm*—Stuart T. Auvinen

[57] ABSTRACT

A distributed client-server application is modified while running. The application is not stopped so that updating of objects is transparent. A meta server catalogs all object classes for both the server and the clients. Modifications are specified by a run-time update tool and converted to change commands. The meta server receives the change commands and updates the structure of an application database. Object class definitions are read from the meta server and modified by the meta server to access the new structure of the application database. The modified object-class definitions are written back to persistent storage for the meta server, and compiled and linked to form new object classes. An object adaptor receives a list of modified object classes from the meta server and notifies all server and client caches of the object classes on the list. The obselete objects are invalidated by the caches and new objects are created using the most up-to-date class definitions. New references to the objects are sent to the new objects, although the old objects continue to process existing references until their reference count reaches zero and they are deleted. Old and new objects co-exist for a period of time during the run-time update.

16 Claims, 11 Drawing Sheets

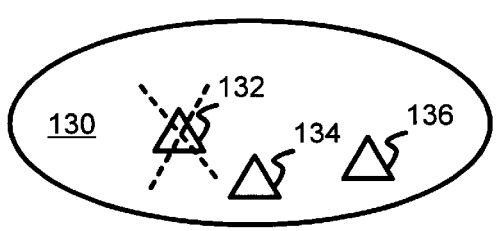 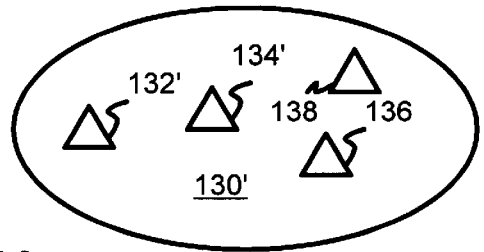
FIG. 7A
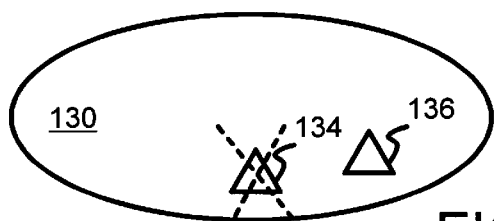 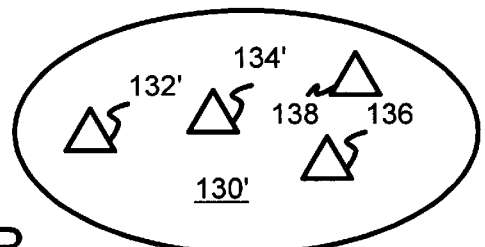
FIG. 7B
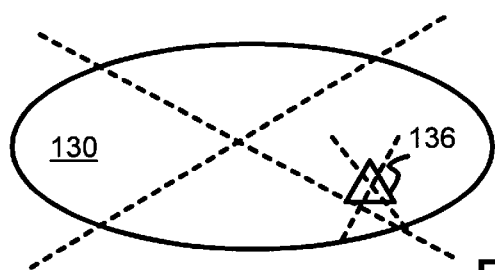 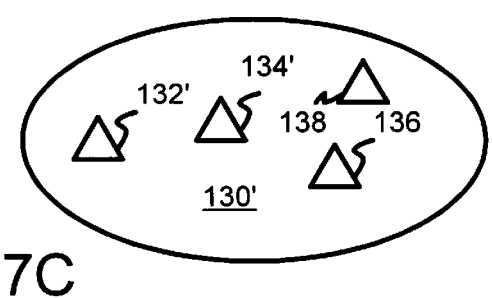
FIG. 7C

RUN-TIME OBJECT-SYNTHESIS AND TRANSPARENT CLIENT/SERVER UPDATING OF DISTRIBUTED OBJECTS USING A META SERVER OF ALL OBJECT DESCRIPTORS

BACKGROUND OF THE INVENTION—FIELD OF THE INVENTION

This invention relates to network database software, and more particularly to updating of distributed-object applications.

BACKGROUND OF THE INVENTION—DESCRIPTION OF THE RELATED ART

The widespread deployment of computer networks has significantly expanded the usefulness of personal computers (PC's). Explosive growth in the world-wide web of the Internet has been followed by businesses building their own internal Intranets and restricted-access Extranets. Large database applications once cloistered on internal mainframe computers have migrated to smaller, less-expensive server workstations and PC's.

Distributed computing has reduced the computing burden on central servers by partitioning software applications across server and client machines. At first, client PC's merely executed viewer or "browser" applications to view documents and data from the servers. Small program routines such as common-gateway-interface (cgi) scripts were executed on the server for the client's browser. Later, browser add-on programs or applets written in Java or ActiveX were downloaded from the server to the browser-client and executed on the user's PC. These relatively small client applets are appropriately known as thin clients.

More sophisticated distributed-computing models and applications are becoming available. These applications use an object-oriented or component model, with larger applications being divided into small containers or "objects" of program code and data. The program objects are distributed to both the server and clients, with the details of network communication hidden from objects through the use of proxy and stub objects which transfer information over the network. Microsoft's Distributed Component Object Model (DCOM) and Object Management Group's Common Object Request Broker Architecture (CORBA) are two competing standards for distributed computing. A basic overview of distributed computing is given by Larry Seltzer in "Future Distributed Computing" and "PC Size, Mainframe Power", PC Magazine Mar. 25, 1997, pages 198–204.

FIG. 1 is a diagram of a distributed application. Server machine 20 contains a large database 26 that is accessed by server objects 22 in a server-side of installed application 24. Thin clients such as browser 16 on client 10' merely request data from database 26 on server machine 20 using server objects 22. Any manipulation or formatting of the data from database 26 is performed by server objects 22 on server machine 20. Relatively little computing is performed on client 10'.

Distributed applications have client-side installed applications 14 on client 10 which operate with server-side installed application 24 on server machine 20. The computing workload is spread across client 10 and server machine 20. Client objects 12 in client-side installed application 14 contain program code and data that reduce the computing burden on server machine 20. Client objects 12 can manipulate and format the data retrieved from database 26 by server objects 22.

ADMINISTRATION & UPGRADE OF DISTRIBUTED APPS

Administration of distributed applications is problematic. Parts of the distributed application software reside on the server, while other parts reside on the client. Usually many client machines may each have different components of the application. Upgrading the application may require replacing software on both the server and client machines. Many client machines may require software upgrading, while other client machines require no upgrading. Some of the client machines may not be accessible due to network or machine downtime.

An example is a human-resources distributed application. A record for an employee contains basic information about the employee:

Name Joe Smith
Address: 1201 University Ave.
Office No: 555-1212
Hire Date: 10-1-95
Salary: 32,000
Dept: Purchasing
Manager: Rick Jones Client objects can display and modify information obtained from the server's database by server objects. For example, accounting can determine the effects of complex pay increases by increasing salaries of different employees by different multipliers, without modifying the server's database.

As technology progresses and the business changes, additional fields are needed. As more employees carry cellular phones, a cell-phone field may need to be added to each record:

Cell No: 371-1001

Adding the cellular phone field requires changes in the server's database, server objects, and client objects that view and edit the phone records. Even using computer-aided-software-engineering (CASE) tools, a non-trivial effort is required to make all the needed changes on all the server and client machines.

FIG. 2 is a flowchart highlighting the steps needed to change a prior-art distributed application. To insert a new field in database records requires that the database's format or schema be modified, step 30. Adding the cell-phone field to the database's records can be accomplished with the statement:

alter table employee add cellno varchar(20), which alters the employee table by adding a field named "cellno" having up to 20 characters.

The interfaces or input and output parameters for program objects which read database records are modified, step 32. The interfaces of many objects can be modified by changing the data structure for accessing the database by adding the new field:

Class employee
{
private:
    char name[64];
    char address[255];
    char officeno[20];
    char hiredate[10];
    float salary;
    char dept[32];
    char manager[64];
    char cellno[20]; //new field added 6-2-97 SA New access functions are added to set the value of the cell-phone field and to read the value of the cell-phone field:

```
public:
    . . . existing program code . . .
    . . .
    Setcellno(char*pcellno) //New Fcn to Write Cell-phone
        field
    {
        strcopy(cellno,pcellno);
    }
    Getcellno(char*&pcellno) //New Fcn to Read Cell-phone
        field
    {
        pcellno=strdup(cellno);
    }
}
```

Once the source code of the class or definitions of the objects are modified, the code is compiled and linked, and new object instances are generated from the class/definition, step 34. Class definitions for server objects that access the database must be changed, as must client objects which view or manipulate the new cell-phone field. CASE tools and 4GL tools including Microsoft's Visual Basic, PowerSoft's PowerBuilder, and Oracle's Designer/Developer 2000 might be useful for generating the code shown above or its equivalence.

Generally these changes to source code and recompilation are performed first in isolation on a test machine or network to make sure that the changes do not cause any new failures of older components. In step 36, an MIS engineer must perform vigorous testing of the re-compiled application to ensure that the changes do not crash the whole system. Typical causes of system crashes include memory corruption and passing of null pointers.

The administrator must then schedule a time to update both the server and all the clients with the re-compiled binary files, step 38. Perhaps time can be scheduled late at night or on a weekend when fewer users are affected. At the scheduled time, the administrator stops or halts all of the application's processes that are still running on the server. All clients processes must also be stopped, step 40. The old objects are replaced by the newly-complied objects, step 42. All clients as well as the server must be updated. Since there can be hundreds or even thousands of clients, script files are often needed just to copy the new objects to all of the client machines. Once all new files have been successfully copied to the server and clients, then the application can be re-started on both the server and the client sides, step 44.

Such a long, tedious process just to add a new field to the database discourages changes to the database application. Being distributed increases the task of updating the application. Testing must be thorough and should include simulated network failures. The popularity of "network computers" (NC's) is due to the low administration cost using thin client applets that are downloaded from the server each time they are used. Thus the client machines require minimal administration.

SIMPLE PROGRAM INTERPRETERS

Some simple programming languages have used interpreters rather than compilers and linkers. These interpreters continually recompile and re-link the program as the user/programmer types in new lines of code. Interpreters have been written for simple languages such as BASIC and APL. The interpreters generally are useful only for small programs that do not use multiple files, as do most modern applications. Thus interpreters have faded from use.

Multi-file applications written in modern languages such as C++ and Java are typically compiled on a client and uploaded and re-installed to a server machine, or compiled and loaded on a server. Distributed programming such as DCOM use temporary program classes known as object factories to generate object instances, but these object factories still require programming effort and are not interactive.

DOWNTIME UNDESIRABLE

Many corporate databases are constantly being accessed, and scheduling downtime is difficult. These mission-critical databases must remain up and running as much as possible. Redundant hardware and software have sometimes been used, but this is wasteful of resources. It is desirable to make changes to a distributed-object database application without shutting the application down. It is desirable to automatically re-compile modified objects and re-load these modified objects without completely shutting down the application. Often only a small part of the application is changed, such as the example of adding the cell-phone field to the employee database. It is desirable to allow other parts of the application to continue to operate as another part is updated.

An easy-to-use interface is desired to make changes to the database. It is desired to add or modify database fields on a distributed application without writing program code or running compilers and linkers. Rigorous testing can be avoided when simple code updates are automatically generated rather than written by hand. It is desirable to automatically distribute and load modified program objects without direct file moves by a system administrator.

What is desired is a programming and administering environment for distributed-object applications. A tool is desired to perform real-time modifications to a distributed-object database application. Run-time object modification and generation is desired.

SUMMARY OF THE INVENTION

A run-time object-updating system updates a distributed-object client-server application with client objects and server objects. The run-time object-updating system has a network connection on a server running the server objects. The network connection transmits and receives packets from a plurality of remote clients running the client objects.

A meta server catalogs object descriptors for object classes in the distributed-object client-server application. A database is coupled to the meta server to provide non-volatile storage. The meta server receives change requests and reads object descriptors from its database and writes modified and new object descriptors to its database in response to the change requests.

A compiler is coupled to the meta server and compiles the modified and new object descriptors from the meta server. The compiler outputs newly-compiled class definitions.

An object adaptor receives the newly-compiled class definitions. It creates new server objects and new client objects using the newly-compiled class definitions. The object adaptor invalidates obsolete objects on the server and on the plurality of remote clients. The obsolete objects are made obsolete by the change requests.

Other server objects and other client objects continue to run while the object adaptor invalidates the obsolete objects and creates the new server objects and the new client objects. Thus the distributed-object client-server application is updated while running.

In further aspects of the invention an application database on the server contains data used by the distributed-object client-server application. The application database is read and written by server objects in response to requests by client objects. The meta server includes structure-update means for updating field definitions in the application database in response to the change requests. Thus a structure of the application database is changed when the server objects and the client objects are updated.

In still further aspects a user interface defines changes to the distributed-object client-server application. The user interface runs on a remote client in the plurality of remote clients. A request generator is coupled to the user interface. It generates the change requests and sends change commands to the meta server. Thus the distributed-object client-server application is modified by the user interface running on the remote client.

In still further aspects of the invention, client caches on each client in the plurality of remote clients store copies of recently-used class definitions and client objects. A cache invalidation means in the object adaptor invalidates copies of the obsolete objects by invalidating obsolete class definitions indexed by the client caches. Thus obsolete client objects and classes are invalidated through the client caches.

BRIEF DESCRIPTION OF THE DRAWINGS

FIGS. 7A–D illustrate objects for a class being deleted and updated.

DETAILED DESCRIPTION

The present invention relates to an improvement in distributed computing. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

META SERVER CATALOGS THE APPLICATION'S OBJECT CLASSES

Traditionally, applications are simply stored in multiple files in one or more directories, such as a "program_name/bin" directory for executable binary files. The application is updated by over-writing some of these executable files.

The inventors have realized that central repository techniques can be used for cataloging and storage of program elements. The inventors construct a meta server that stores the object descriptors for all programming objects and uses a database to provide non-volatile storage to this repository of object descriptors. New instances of objects are created from the object description fetched from the meta server's database.

The concept of a central meta server that catalogs object descriptors (class definitions) for program objects is contrary to the concept of distributed computing, where objects are spread across a network. Thus it is counter-intuitive and surprising for a distributed application to use a central repository of programming-object definitions. This unusual arrangement provides several advantages for administration and programming updates since the central meta server controls generation of all program classes.

Newly instantiated objects can be located on the server or on a client machine for a distributed application. Accessing the central meta server on a server machine could slow performance of client applications, so caches are located on the client machines to store class definitions. A notification mechanism is used to replace existing classes on client machines when the object's definition is changed in the meta server. Notified objects can then be re-loaded at an appropriate point.

Thus even remote client objects can be replaced or updated as the application is running. The application does not have to be completely closed, re-compiled, re-linked and re-stated for each minor change. Especially for distributed applications is such run-time updating useful.

META SERVER UPDATES DISTRIBUTED APPLICATION

Figure 1:
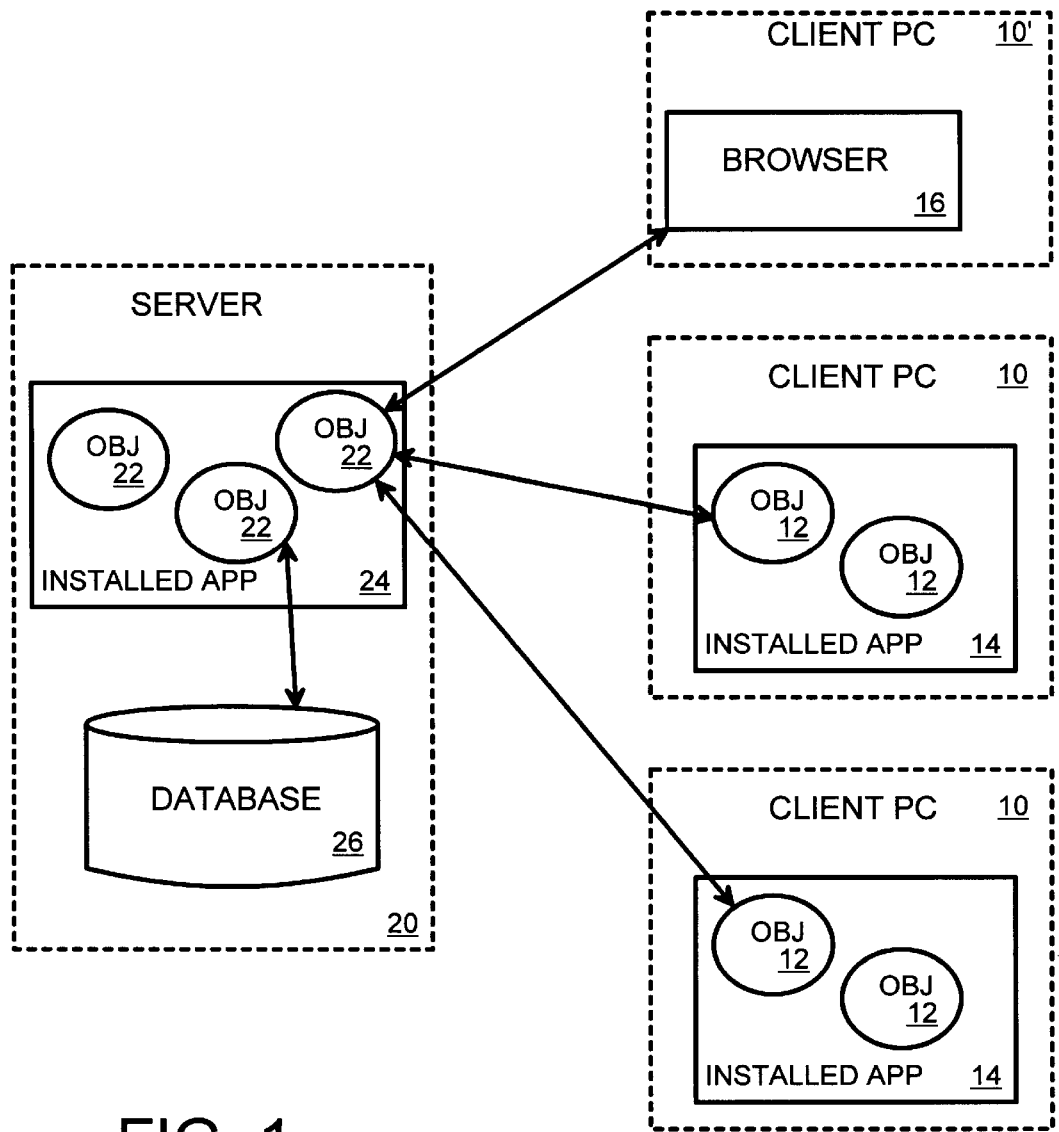
FIG. 1 is a diagram of a distributed application.
Figure 2:
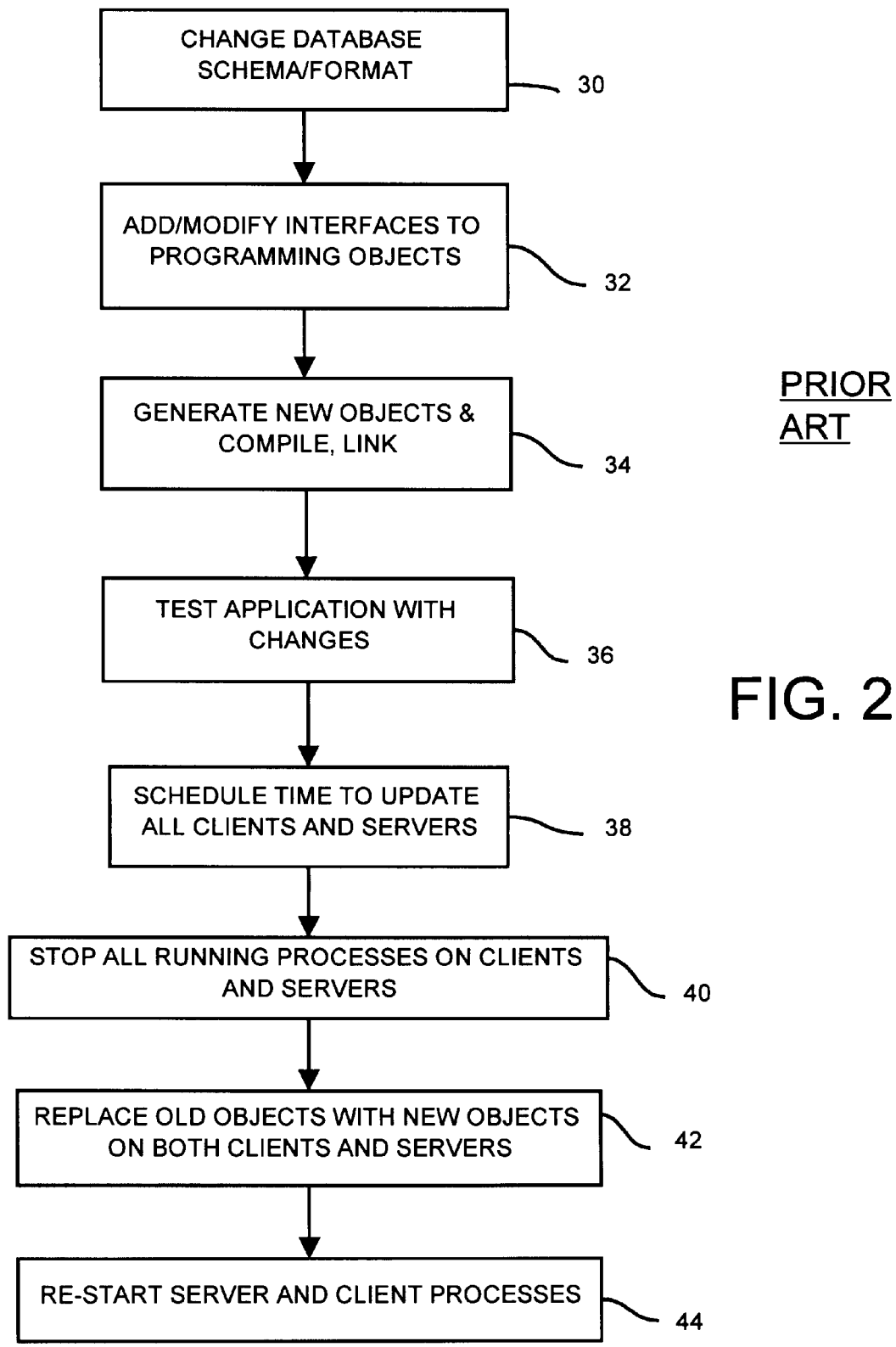
FIG. 2 is a flowchart highlighting the steps needed to change a prior-art distributed application.
Figure 3:
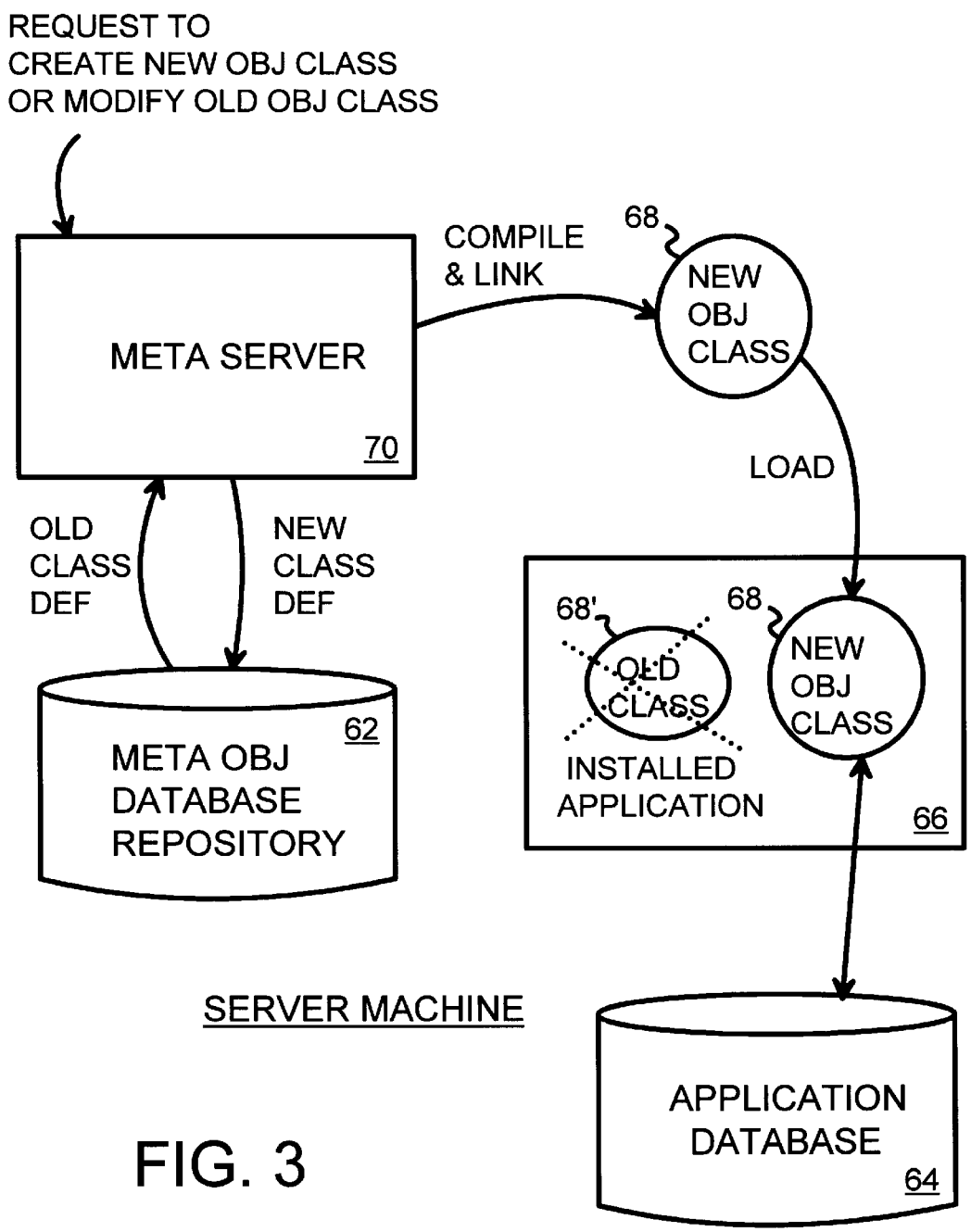
FIG. 3 is a diagram of a meta server updating a distributed application.

FIG. 3 is a diagram of a meta server updating a distributed application. Modifications are specified by a user. User requests to create or modify object class definitions are received by meta server 70. Meta server 70 is a program-object cataloging program running on a server machine. Meta server 70 loads source code and object descriptors from meta server's non-volatile storage 62 and modifies the source code to process the request.

Meta server's database 62 is a non-volatile repository of all object class definitions for the distributed application. Even remote objects that are instantiated only on remote clients and not on the server have their class definitions stored persistently in meta server's database 62. The class definitions include the interface definitions, attributes, procedures, and grouping of objects into folders. The class definitions contain the blueprint of objects that are inherited by each instance of an object generated or instantiated. Every time an object is instantiated, the object class definition in meta server 70 serves as the blueprint, although a cache of that object class definition may be used to speed up object creation.

The revised object definition will be stored into meta server's non-volatile storage 62 and is compiled and linked by meta server 70 to generate a new class factory for the revised object, modified class 68. Compiled binaries of objects are stored outside the meta database on the server's file system.

Modified class 68 is copied into installed application 66, and new requests to access application database 64 are processed by installed application 66. Existing class 68' is deleted once it is no longer being referenced by clients or other objects. Existing class 68' may continue to process an older request for a period of time after modified class 68 is installed.

Modified class 68 may need to be re-installed on a client-side of the installed application. Both server and client classes are updated by meta server 70.

BASIC FLOW FOR UPDATING DISTRIBUTED APPLICATION—FIG. 4

Figure 4:
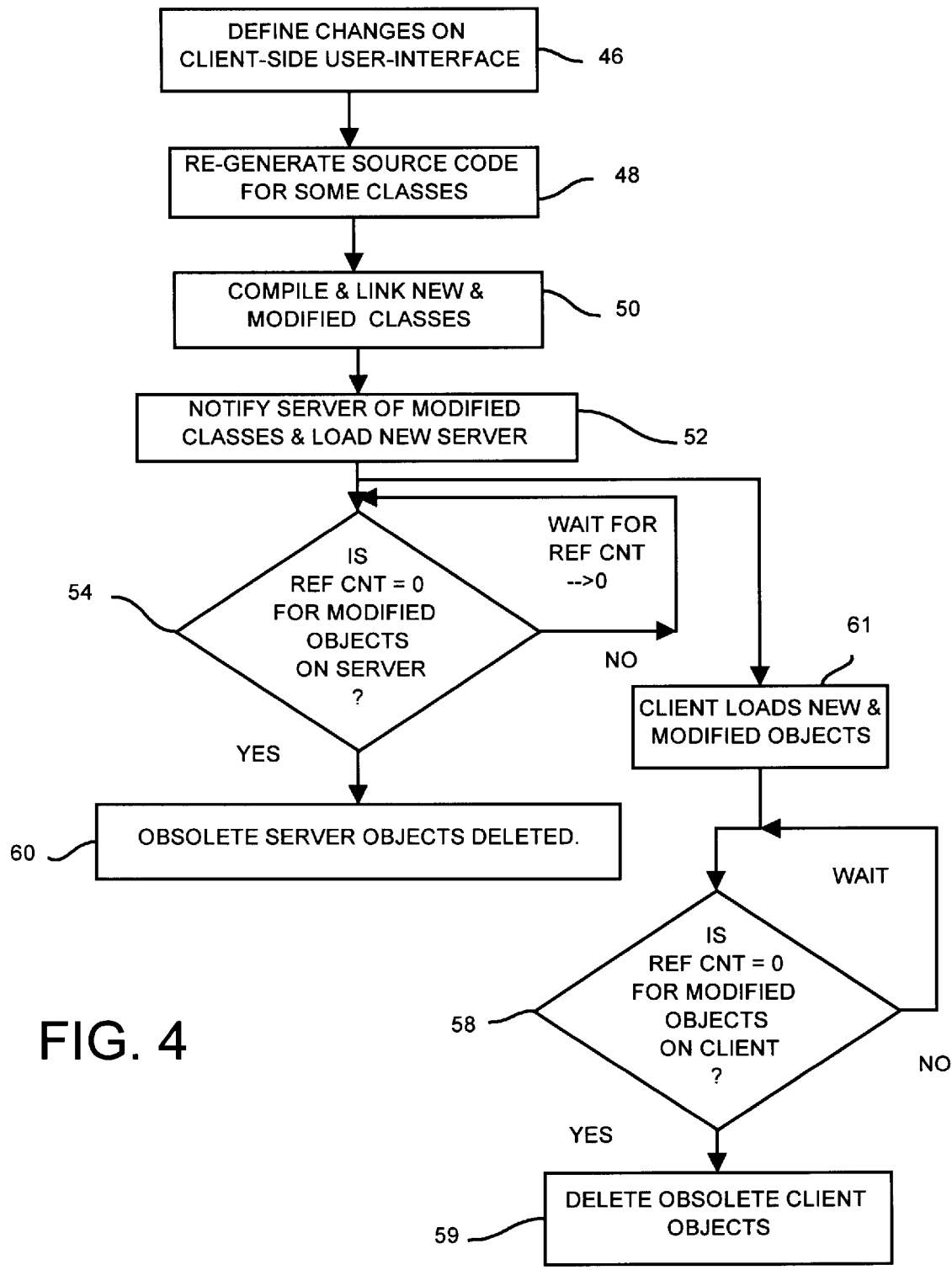
FIG. 4 is a flowchart illustrating a run-time update to a distributed application.

FIG. 4 is a flowchart illustrating a run-time update to a distributed application. The changes to the application are defined by a user on a user-interface that operates on one of the client machines, step 46. This user interface allows the user to specify fields in a database to add, delete, or modify, such as adding a cell-phone field to an employee database. Simple changes to the database can be defined using a graphical user interface. More complex changes such as adding a new routine require pasting in program code to a box in the interface. Thus more complex changes still require programming skill.

Once user has finished defining the changes, these changes are sent to the server for updating the application. From the user's definitions, the server re-generates the source code for changed class definitions of objects, step 48. The object class definitions are re-compiled and re-linked, step 50.

Some of the existing object instances now no longer match their modified object class definitions. Notification is made from the server that some object classes have changed, step 52. The newly modified classes are loaded to the server, using a cache of classes. Any existing objects on the server that belong to the changed classes are notified by being marked invalid in the cache.

Objects may be in use by another object and often cannot immediately be deleted, since the change may adversely affect the interface to the other referencing object, possibly crashing the system. Instead of immediately deleting obsolete objects, a check is made to determine if other objects are using the object about to be re-loaded. The object's reference count is tested, step 54. The reference count indicates the number of other objects that are currently communicating with the object. Once the reference count reaches zero, then no other objects are referencing the object. The object can then be deleted safely. The reference count test, step 54, is performed in parallel for all objects on the server machine that are being updated. Some objects reach a zero reference count before others and so are deleted earlier.

Objects marked as invalid can be re-loaded and then deleted when the reference count reaches zero. Re-loading is the process of re-instantiating the object using the most up-to-date class definition, but preserving the state of the object. Once each server object reaches a reference count of zero, the server objects is deleted, step 60.

Once all classes on the server have been re-loaded, then the client classes are updated. The newly updated class definitions for client objects are loaded, step 61. Creation of new client objects now uses the blueprint of the newly updated class definitions. All objects belong to the modified class in the client object cache will be marked invalid.

Each client object marked invalid has its reference count checked, step, 58. When a client object's reference count drops to zero, it can be deleted, step 59. Some client machines may be idle, having objects with a zero reference count, and can delete objects immediately. Other client objects that are referencing these invalid objects can choose to reload the objects at any time.

ADAPTOR CONTROLS OBJECT UPDATING—FIG. 5

Figure 5:
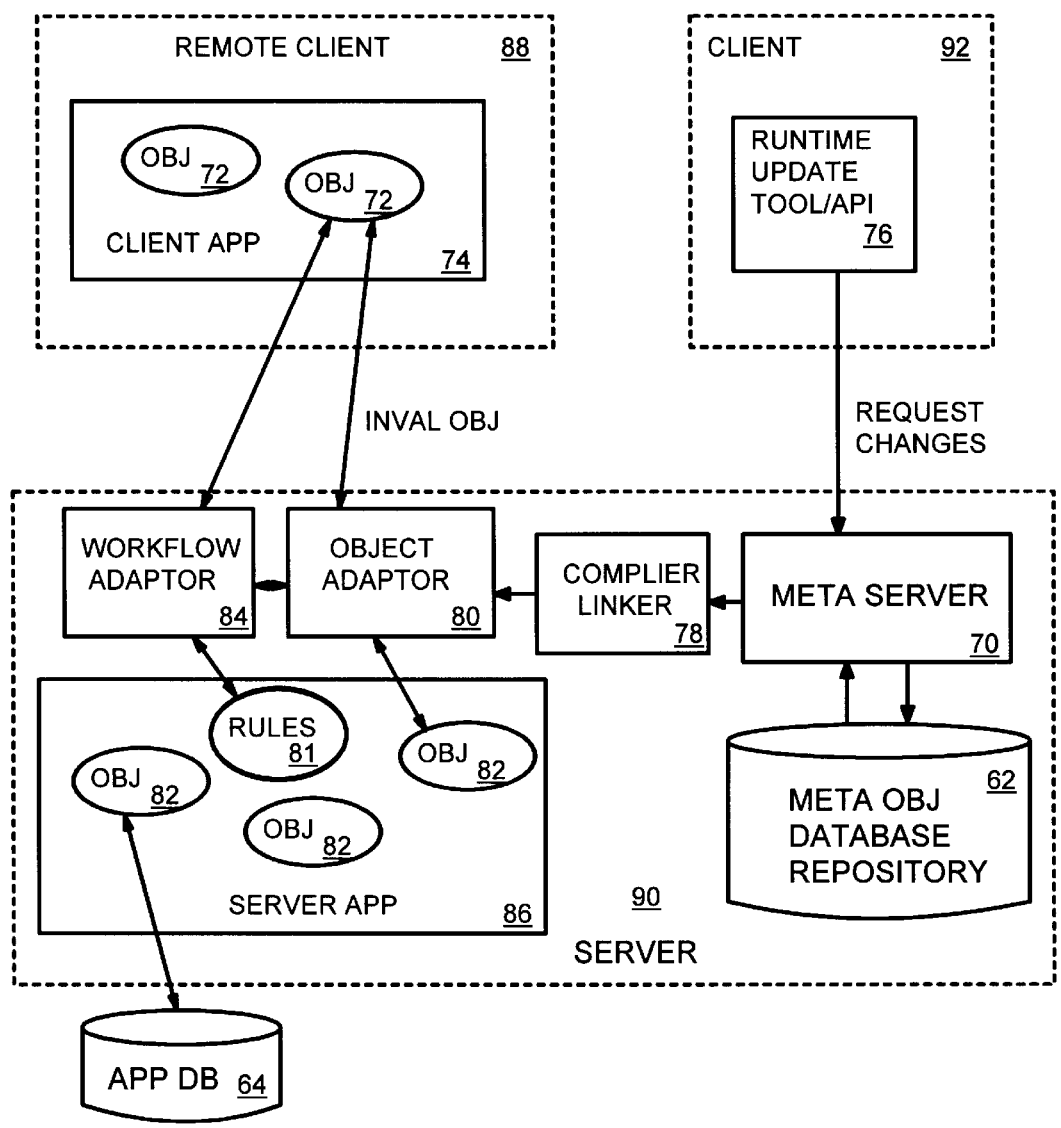
FIG. 5 is a diagram of a distributed application with an adaptor for updating objects cataloged by the meta server.

FIG. 5 is a diagram of a distributed application with an adaptor for updating objects cataloged by the meta server. Modifications to a distributed database application are specified by a user of run-time update tool 76. Remote client 92 displays a graphical user interface to the user who identifies the changes. An application-programming interface (API) is used to specify the changes and transmit them to meta server 70.

Meta server 70 receives the change requests from runtime update tool 76 and modifies some of the object class definitions and then stores the changes in meta server's non-volatile storage 62. Meta server's non-volatile storage 62 is a repository of all object descriptors and class definitions for both clients and servers. Compiler/linker 78 compiles and links the class definitions and generates modified objects. The old object-class definitions cannot be replaced immediately because they may be in use by the application, which is still running.

Object adaptor 80 receives a list of the modified object classes and sends a notification to the object cache. The notification tells the object cache that an object class has been revised. The object cache must mark as invalid all active object instances for the corresponding class. Some objects can be deleted right away when their reference count is zero. Some objects are being accessed by other objects and cannot simply be deleted. These busy objects remain until released by the other objects. Once released, these objects can be deleted.

Object adaptor 80 sends change notifications to object caches on both server machine 90 and client 88, and other clients (not shown). Server objects 82 listed in a server cache are notified first before client objects 72 listed in a client cache are notified. This allows the changes to be propagated outward. Any changes to application database 64 can be made first, followed by changes to server objects 82 in server-side application 86 which access database 64. Finally, client objects 72 listed in a client cache for client-side application 74 are updated. When clients are updated with the new features, application database 64 and server application 86 which accesses database 64 have already been updated. Thus a smooth update occurs with the new features not being requested by the client until the server can support them.

WORKFLOW RULES RE-EVALUATED WHEN OBJECTS UPDATED

Server-side application 86 also includes workflow rules 81. Workflow rules 81 are conditions that are checked and actions taken when condition is met. For example, the workflow rule:

<"reimbursement amount>$100", "request approval from mgr"> specifies that requests for reimbursement that exceed $100 must be approved by the manager. An client object that generates a reimbursement request to accounting registers itself with workflow rules 81. Any change in the client object, such as submitting the request, calls workflow rules 81 before passing the request to an accounting object. Requests of less than $100 are simply passed on to an accounts payable object, while requests greater than $100 trigger an approval object to request the manager's approval.

Workflow rules 81 can be quite complex and adaptive. Should the manager be away, the rules can specify that the director approve the request instead.

Workflow rules can be easily changed. The rules are evaluated only on the server side and are evaluated when the objects involved change their values or states.

Workflow adaptor 84 is used to cause workflow rules 81 to be re-evaluated when objects are updated. A callback or subscribe-notify model is used. Workflow adaptor 84 subscribes to each object when the object is first created by the application. The application logic executes the command:

object.addObjectListener(wfAdaptor);

which accesses the object and executes the object's add object listener function, adding workflow adaptor 84 as a listener. When the object is updated and changes state the command:

wfAdaptor.objectChanged(object);
is called by the object, telling workflow adaptor 84 that the object has been updated. Workflow adaptor 84 then evaluates workflow rules 81, identifying the changed object, and executes the corresponding actions.

OBJECT ADAPTOR SUBSCRIBES TO AND NOTIFIES OBJECTS

Object adaptor 80 is used as a proxy by the meta server to notify objects when updates are needed. Object caches subscribe to object adaptor 80 for a particular class by executing the function:

objClass.addObjectListener(CacheAdaptor);

This adds the client object cache as a listener for the class. When meta server 70 updates an object class, object adaptor 80 sends a notification to the object caches when the meta server calls the cache adaptor function:

CacheAdaptor.objectChanged(objClass);

The object caches then invalidate the entry for the object class, and for all objects in that class, by clearing a valid bit in the cache. Any new object instances are generated from the new class definition, reloading the cache with the updated object class definition in the process. Old instances of the invalidated objects remain in use until their reference counts go to zero, when they are deleted. Another client object which is referencing an invalid object can read the invalid bit from the cache and decide to release the invalid object and load the updated object.

Another object that is referencing the object has the responsibility of determining when the object has been invalidated. Objects can read the valid bit or those of other objects by executing the function:

obj.isInvalid();

which reads the invalid bit in the object (obj) itself. An invalid object does not have to be refreshed immediately, although that is the preferred behavior. The object can continue operating, even though it has not yet been updated. For the example of adding the cell-phone field to a database, old objects can continue to access the old fields of the database. The cell-phone field is simply blank or invisible to the old object. However, no persistence operations, such as saving an attribute, state, or object, are allowed. An exception is raised if any persistence operation is performed by an invalid object.

HEIRARCHY OF UPDATABLE DISTRIBUTED APPLICATION

Figure 6:
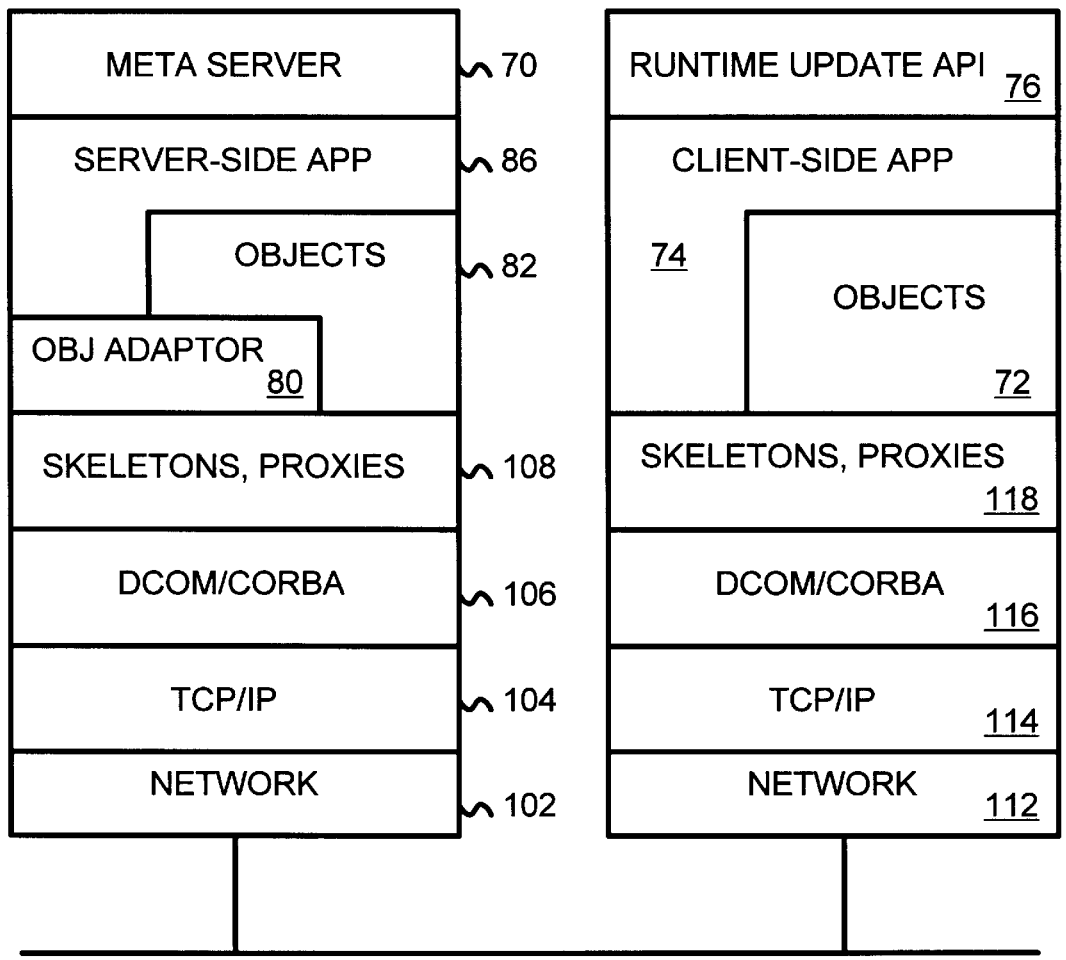
FIG. 6 is a hierarchy diagram of a distributed application that is updateable by a meta server.

FIG. 6 is a hierarchy diagram of a distributed application that is updateable by a meta server. Meta server 70 operates on top of server-side application 86, cataloging object class definitions used to generate server objects 82. Object adaptor 80 is notified when meta server 70 changes a class definition. Object adaptor 80 then notifies the subscribers (object caches) of those objects 82 that have been modified. The obsolete objects are deleted once all references to them have been released.

Similar mechanisms are used to update classes and objects for client side application 74. When the class definitions for one of client objects 72 is modified, meta server 70 causes object adaptor 80 to notify the client object cache of the obsolete client objects 72. Each obsolete client object 72 is deleted once all references to it have been released. Object adaptor 80 notifies client objects 72 using DCOM or CORBA, which ultimately use network packets, such as TCP/IP packets.

The details of network communication are hidden from server objects 82 and client objects 72 by skeletons and proxies 108, 118 on the server and client machines. When a client object 72 desires to communicate with a server object 82, a skeleton for the client object is created on the server machine and a proxy for the server object is created on the client machine. The client object 72 communicates with the proxy 118 which acts as an agent for skeleton 108. The skeleton and proxy appear to other objects on the machine to be the client and server objects, so communication with the local skeleton or proxy is straightforward. The skeleton on the server machine communicates with the proxy on the client machine using network protocols similar to remote-procedure calls (RPC's).

Middle-ware layers 106, 116 provide network support functions such as providing high-level addresses or machine names for the stubs and proxies on other machines. Microsoft's Distributed Component Object Model (DCOM) and Object Management Group's Common Object Request Broker Architecture (CORBA) are two competing standards for distributed computing middle-ware. Middle-ware layers 106, 116, and skeletons, proxies 108, 118 hide the details of network communication from other objects in the high-level applications. This allows objects in the application to transparently access remote objects on other machines as though the objects were on the local machine.

Transmission-control protocol/Internet-Protocol TCP/IP layers 104, 114 divide the information into packets, and append internet-protocol (IP) addresses for the source and destination machines. Network layers 102, 112 perform local-area-network routing and low-level error detection, and interface with the physical media of the network.

Run-time update tool 76 is a user interface for defining changes to the application and its database. A high-level API is used to send the defined changes to meta server 70. Run-time update tool 76 can operate on one of the client machines or on the server itself. Run-time update tool 76 uses a proxy object for meta server 70 while meta server 70 defines a skeleton for run-time update tool 76. Thus skeletons, proxies 108, 118 can be used for communication between run-time update tool 76 and meta server 70, hiding the details of lower layers 106, 116, 104, 114, and 102, 112.

UPDATING AND DELETING OBJECTS—FIG. 7

Figure 7D:
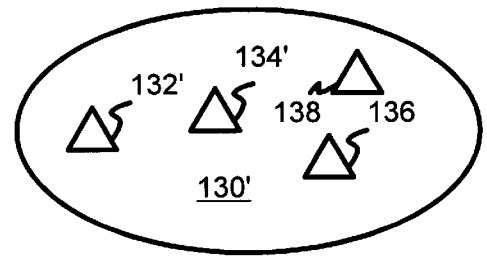

FIGS. 7A–D illustrate objects for a class being deleted and updated. In FIG. 7A, objects 132, 134, 136 belong to class 130. Each object maintains its own reference count, which is incremented as another object references it, and decremented as the other object releases it.

In FIG. 7B, class 130 is updated, so objects 132, 134, 136 are each marked invalid in the object caches. A class 130' is generated while class 130 still exists. Replacement objects 132', 134', 136' and a new object 138 are instantiated using the new class 130'. New references to objects 132, 134, 136 are no longer made when these objects are marked invalid. Instead, new references are made with the replacement objects 132', 134', 136' in class 130'. Old references to objects 132, 134, 136 continue to exist until released. Thus old objects 132, 134, 136 continue processing of their old references, although new references are routed to the new objects 132', 134', 136'.

Object 132 already has a reference count of zero, so it is immediately deleted. Objects 134, 136 have non-zero reference counts as other objects are still referencing them. In FIG. 7C, the reference count for object 143 has reached zero and object 134 is deleted. After a further amount of time, object 136 reaches a reference count of zero as its last referencing object releases its interfaces. In FIG. 7D, object 136 is deleted. As there are no longer any objects referencing class 130, class 130 is also deleted. Now only the new objects 132', 134', 136', 138 belonging to class 130 exist.

TIMING OF OBJECT UPDATES—FIG. 8

Figure 8:
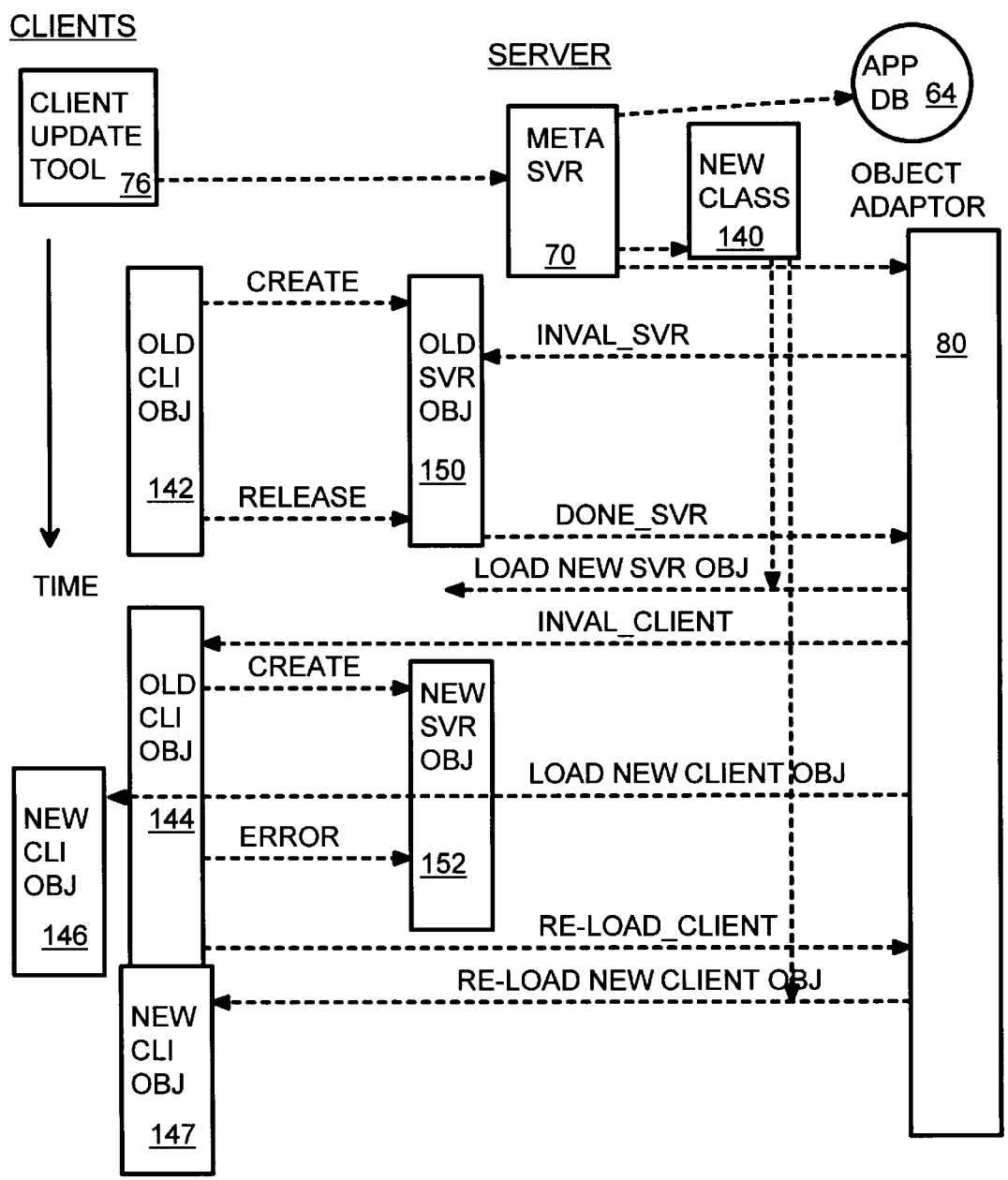
FIG. 8 is a timing-entity diagram showing when client and server objects are updated.

FIG. 8 is a timing-entity diagram showing when client and server objects are updated. Run-time update tool 76 operates on one of the clients, telling meta server 70 what high-level changes to make. When it saves its objects into persistence storage, Meta server 70 updates application database 64, adding new fields or modifying or deleting existing fields. For a relational database, tables may be added, modified, or deleted, as may the relationships between tables. Meta server 70 also modifies object descriptors in its database (not shown), and compiles and links the object class definitions to generate new classes 140. The class definitions are compiled and linked to generate class factories. Object instances are created by the class factory.

Object adaptor 80 is called by meta server 70, which sends a list of the modified classes to object adaptor 80. Object adaptor 80 first invalidates the server objects, then the client objects. Object adaptor 80 sends an invalidation notice the server object cache to invalidate the old server object 150, which was generated from one of the classes that was modified. However, server object 150 is being referenced by client object 142. Eventually client object 142 releases old server object 150, which is either deleted (destroyed) or re-loaded with a new server object based on new classes 140.

Object adaptor 80 also updates the client class definitions. An invalidate notice is sent to the client's object cache, invalidating the client. However, old client object 144 has already begun to reference new server object 152, which was created based on new classes 140 when old client object 144 instantiated the server object. Since old client object 144 has an old interface while new server object 152 has a new interface, an error occurs. An error is signaled from new server object 152 to old client object 144. An error-handling routine in old client object 144 determines that old client object 144 is invalid. The error-handling routine then re-loads old client object 144, which becomes new client object 147. The state of old client object 144 is transferred to new client object 147 when it is created from new classes 140. New client object 147 can then re-access or re-create new server object 152 and use the new interface.

Other client objects can exist on the same or on other client machines. New client object 146 is created after object adaptor 80 sends the client invalidate notification. New client object 146 is thus created from new classes 140. New client object 146 exists while old client object 144 is still active. New and old client objects 146, 144 can co-exist even on the same client machine as explained in the previous FIGS. 7B–7C.

Object operations on the server require the client to acquire a lock bit or mutual-exclusive (Mutex) semaphore before proceeding. The semaphore prevents clients from saving new object instances until the semaphore is released. Semaphores are withheld during updating of classes. Thus the semaphore prevents clients from accessing a class definition while that class definition is being changed.

CLIENT CACHING OF OBJECTS

Figure 9:
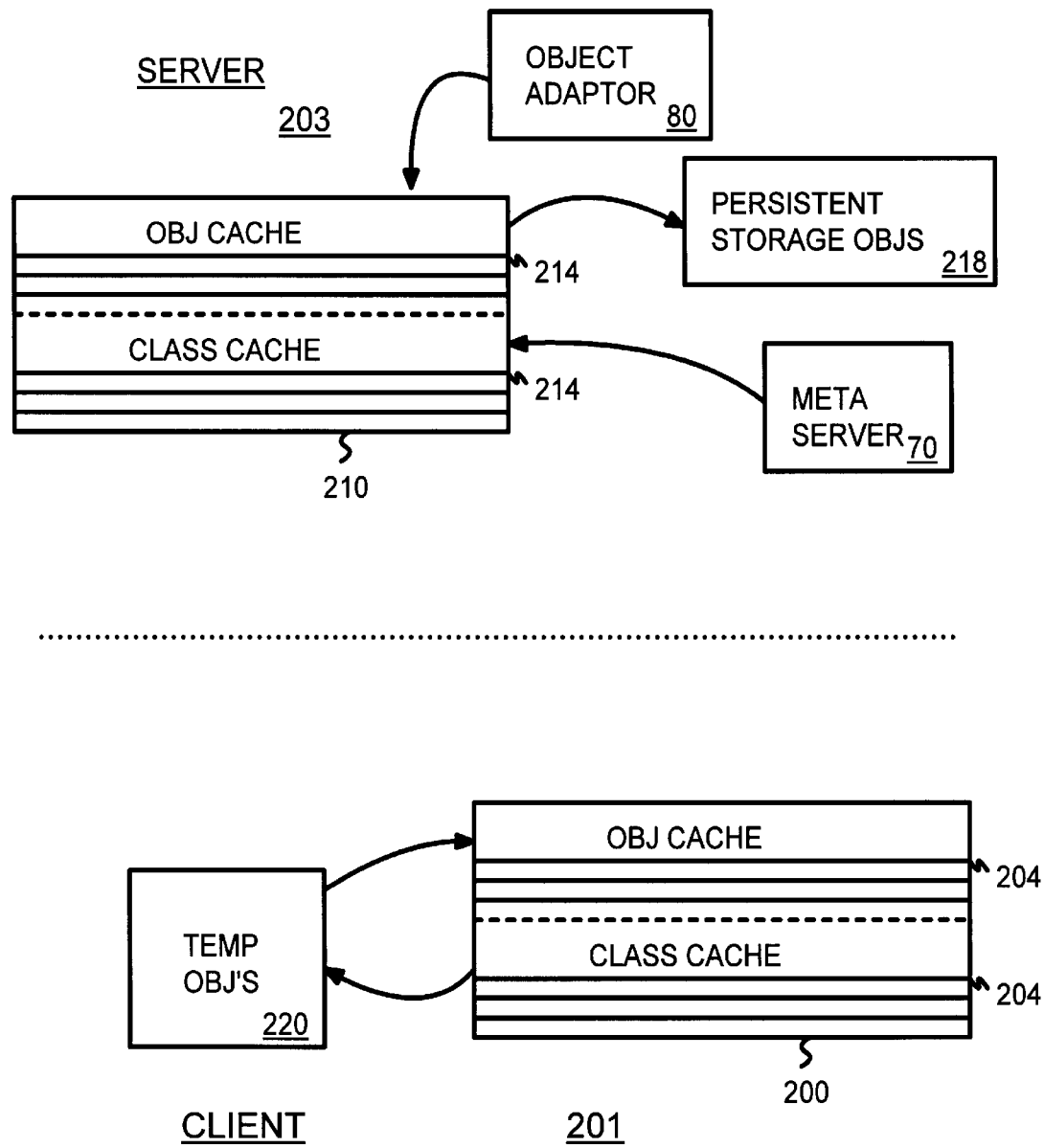
FIG. 9 is a diagram of client and server caches of objects and classes.

FIG. 9 is a diagram of client and server caches of objects and classes. Object creation on the client machine requires that the object's class definition be accessed. This class definition is stored in persistent storage such as the meta server's database on the server machine. Object creation thus requires network communication from the client to the server. Network communication is relatively slow and thus reduces performance of object creation.

Network communication can be reduced by using a local cache of the object classes. The local cache resides on the client machine and thus objects can be generated without accessing the object class definitions on the server. Local copies of the most-recently-used classes are stored in the client cache. These most-recently-used classes are likely to be used again by that client, as a typical user tends to perform the same kind of tasks.

Objects as well as object classes can be stored in the client cache. This allows copies of objects to be quickly recalled. The server can also have its own cache, perhaps a larger cache, of both client and server objects and classes.

Invalid bits are part of each object instance. The client cache contains an index of all object instances of a particular class. This provides a quick mechanism for the object adaptor to invalidate objects, as the object adaptor need only command the client cache to invalidate a class. The client cache uses its index to locate each object instance for the invalidated class. The client cache then sets invalid bits for each objects instance for the classes being updated. The object instance itself in the client's memory does not have to be directly invalidated by the object adaptor. This saves computational work since objects can reside at different addresses, saving the object adaptor from performing address lookups or translation. The object adaptor merely has to send notification with a list of invalid object classes to the client caches. Each client cache then searches for objects and classes from the notification list, and invalidates these objects.

New references to invalidated objects cannot find the desired object in the client cache, and must use a cache miss handler. The new class definition is fetched over the network from the meta server. The new class definition is then loaded into the client cache for future use in creating objects from that class.

Client cache 200 on client 201 contains object entries 204 that are copies of recently created objects in client memory 220. Caching objects improves performance. Object class entries 202 in client cache 200 contain copies of class definitions from meta server 70 on server 203.

Each object instance or object class is identified by a unique object ID. There can exist one and only one most up-to-date valid object instance in the client cache for a particular object ID at any time. However, there could be multiple invalid copies for the same object ID outside the cache. They get deleted when there are no more references to them.

Server cache 210 on server 203 contains object entries 214 that are copies of recently created objects in client memory 220 from many different clients. Object class entries 212 in server cache 210 contain copies of class definitions from meta server 70 on server 203. Server cache 210 also contains server objects and classes for objects created on server 203.

Client memory 220 is a non-persistent or temporary memory. Client objects in client memory 220 are transient. Client objects that must be saved are saved to persistent storage 218 on server 203. These saved objects are also cached in server cache 210. Using non-persistent client memory allows client 201 to be a thin client with limited resources, such as clients without a hard disk. Of course, client 201 could have more resources, but the distributed application is designed to function with the least powerful clients.

RUN-TIME UPDATE TOOL—FIG. 10

Figure 10:
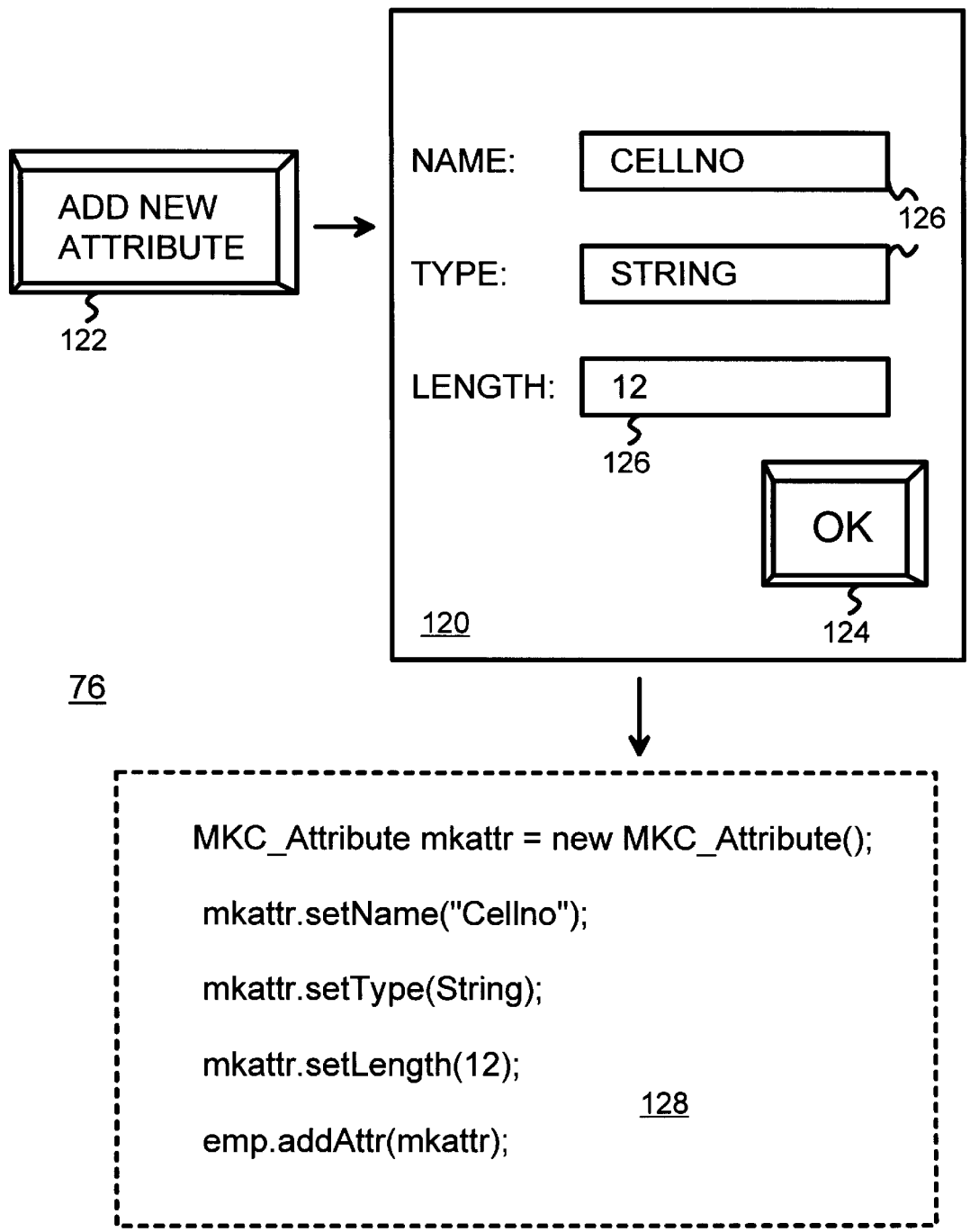
FIG. 10 is a diagram of the run-time update tool.

FIG. 10 is a diagram of the run-time update tool. A user interface is presented to a user on a client machine. The user updates the class definition in the meta server by specifying a new field to be added to each record. In the example of FIG. 10, a cell-phone field is being added to employee records. The new cell-phone field could be an additional field in an employee table in a flat database, or a new cell-phone table that is linked to an employee table in a relational database, or a new attribute for an employee object in object database.

The user begins the change by clicking on the Add New Attribute button 122 on run-time update tool 76. Attribute window 120 is displayed to the user. The user types in the name of the new field, "cellno", and the field type, "string" in input fields 126. Since strings have variable length, length field 126 is displayed to the user. The user specifies the string's maximum length as "12" characters.

Once the user is satisfied with the addition, the addition is approved by clicking OK button 124, closing attribute window 120. Run-time update tool 76 then converts the user's inputs into API function calls 128 to the meta server. The API calls are made directly to the meta server. The run-time update tool is a client to the meta server.

The first statement in the list of API calls 128 instructs the meta server to make a new attribute. The attribute's name, type, and string length are specified in the next three lines. The final line of Java code:

emp.addAttr(mkattr);

tells the meta server to add this attribute as a field to the employee class named "emp" in the application database. Since a generic object access interface is provided, no change to the interface for accessing fields in the object is required. For example, to retrieve and store the newly added cell-phone field in the example, the following code segment can be used:

Employee henry; // Employee is the class here
henry.setValue("Cellno", "415-5554-0000"); // to set the cellular number
String cellno=henry.getValue("Cellno"); // to get the cellular number API calls 138 modify the class definitions in the meta server's database. Compilation and notification then proceeds, updating the entire application, including the database and objects.

OBJECT SCHEMA FOR META-SERVER

The meta server object schema is adapted to store programming-object class definitions. It is an application component composed of objects which are grouped into folders. Folders group related objects together. Folders also perform management of objects within the folder, such as creation of new object instances and deletion of existing object instances at run-time. Folders can be local or remote folders.

Classes are the basic program unit cataloged by the meta server. Classes have multiple properties called attributes. Classes also can have one or more routines, which are operations performed by the object. Objects instantiated from a class can be transient objects, such as client objects, or persistent object such as server objects and client objects stored to the server's persistent memory.

The terminology used herein has this hierarchy:
application component
  folder of classes
    classes:
      attributes
      routines.

A class in the meta server (a MS_Object) contains the following:

1—ID (Generated by the system, unique for each object)
2—Name (Name of the object)
3—Transient flag—indicate if the object is persistent or transient
4—Add Access Vector—privilege for adding
5—Delete Access Vector—privilege for deletion
6—A free formatted text area
7—A list of Attributes by ID
8—A list of Routines by ID
9—which folder the object belongs to.

An attribute in the meta server for an object class contains the following:

1—ID (Generated by the system)
2—Name (Name of the attribute)
3—Attribute Type (Integer, String, Text . . . )
4—User Object Type (for object, or list of objects types)
5—Display length, for string or text
6—Remote Flag—is this attribute a remote object
7—Remote Folder Name—if this attribute is a remote object, what is the folder
8—Bit Vector to indicate the properties of this attribute
9—Read Access Vector (for read privileges)
10—Write Access Vector (for write privileges)
11—Which object it belongs to.

A routine is stored in the meta server with an ID and a text field which contains the routine's program code. Attributes can be of types string, integer, floating-point, data, Boolean, and sequence. A text type is an unlimited-length string. The attribute can also be of type object, identifying an object, or list of objects, the attribute being a list of objects. Thus attributes can point to other objects.

EXAMPLE OF A DEFECT-TRACKING APPLCIATION USING A META SERVER

Figure 11:
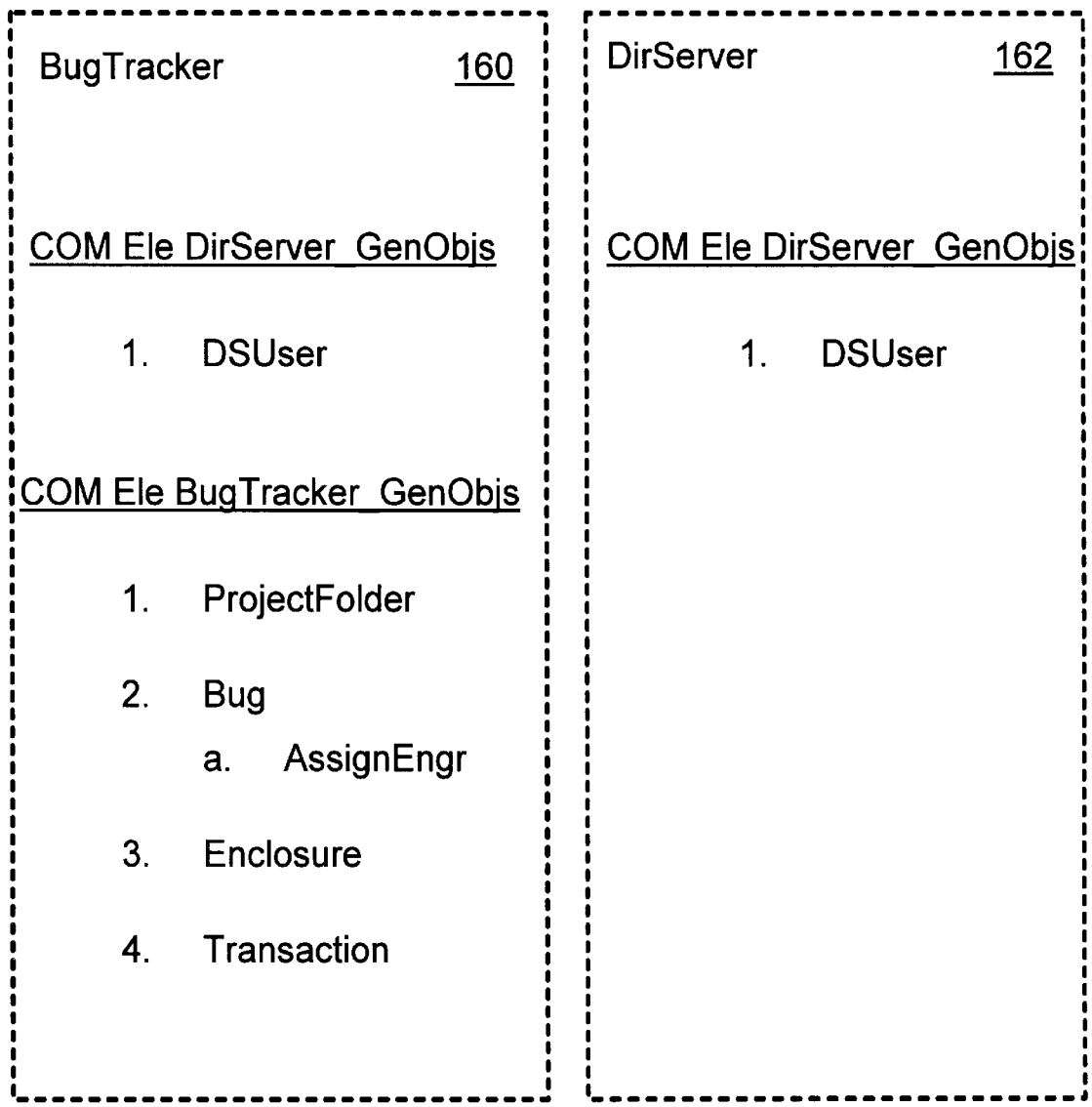
FIG. 11 is a diagram of object classes in an example application cataloged by the meta server.

FIG. 11 is a diagram of object classes in an example application cataloged by the meta server. The example application is a defect-tracking application. The defect-tracker is a distributed application with a server that has a database of the defect or bugs, and client objects to view and edits the status of the defects from client machines.

The server has a bug-tracker component 160, which is a running program instance on the server machine. Each client has a directory server component 162, which are running program instances on the client machines. Directory server component 162 has a single folder named COM_Ele_DirServer_GenObjs; this folder has only a single object, "DSUser". The DSUser object stores user information, such as user id, email address, etc.

Bug-tracker component 160 has defined a remote folder referencing COM_Ele_DirServer_GenObjs. This accesses the DSUser object, which resides on a remote Directory Server component.

Bug-tracker component 160 has a second folder "COM_Ele_BugTracker_GenObjs" that contains the server objects to access and the defect database. The first object "Project-Folder" lists the projects or products being tracked. The second folder "Bug" contains the defects or bugs tracked. It has an object attribute "AssignEngr", the name of the engineer assigned to resolve the bug. The third object is "Enclosure", which contains the details of the defect report. The final object "Transaction" holds the log of updates of the defects in the database.

Multiple instances of each of the object classes in FIG. 11 can be created and executed. For instance, each client machine can have its own DSUser object running, and multiple DSUser skeleton objects run on the server to communicate with the client DSUser objects.

Each of the object classes in FIG. 11 has its class definition stored in the meta server's database. Updating of the defect tracking application can be performed by the run-time updating tool, which tells the meta server what changes to make, such as later adding fields for the severity of each bug. The class definitions stored in the meta server's database are modified, and new class definitions and object instances are compiled and linked. The object adaptor then notifies the caches to invalidate the updated running objects. These objects are deleted when their reference counts reach zero.

The entire defect-tracking application can be written using the meta server's API used by the run-time update tool. A code generator is used to convert the API commands to class definitions and routine code.

ADVANTAGES OF THE INVENTON

The invention allows an application to be updated without stopping the running application. Client and server machines do not have to be scheduled for down-time to update the distributed application. Administration is simplified. Extensive testing is not needed as the meta server generates the code. Robust objects are used that follow procedures to check for object invalidation during an update.

Mission-critical databases that must remain up and running as much as possible can benefit from being cataloged by the meta server. Redundant hardware and software in not needed, reducing needed resources. Changes to a distributed-object database application are made without shutting the application down. Objects are automatically re-compiled and re-loaded without completely shutting down the application.

The invention is especially useful when only a small part of the application is changed, such as the example of adding the cell-phone field to the employee database. Other parts of the application continue to operate as one part is updated.

An easy-to-use interface is used to change the programming object and its associated non-volatile storage schema, such as a table in the database. Fields in the non-volatile storage (e.g. database) are added or modified on a distributed application without writing program code or running compilers and linkers. Rigorous testing can be avoided when simple code updates are automatically generated rather than written by hand. Modified program objects are automatically distributed and loaded without direct file moves by a system administrator.

The invention provides a programming and administering environment for distributed-object client-server applications. The run-time update tool and the meta server perform real-time modifications to a distributed-object database application. Run-time object modification and generation is the result.

ALTERNATE EMBODIMENTS

Several other embodiments are contemplated by the inventors. Rather than strictly for database applications, the invention can be applied to file systems and directories. Object databases as well as relational or flat database can be used. While one server and multiple clients have been described, the server may itself span multiple machines. One server machine may serve the application component to the primary server, while another server access the meta server for the primary server. Redundant or geographically remote servers can also be employed. Separate caches for object instances and for object class definitions can be used to optimize cache performance and size. Personal computers, network computers (NC's), and other platforms may be used. The invention can be applied to multi-tiered applications rather than just two-tiered client-server applications.

Different protocols compliant with DCOM or CORBA can be used, and different network middle-ware such as DCOM or CORBA can be used by the meta server.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A run-time object-updating system for updating a distributed-object client-server application having client objects and server objects, the run-time object-updating system comprising:

a network connection on a server running the server objects, the network connection for transmitting and receiving packets from a plurality of remote clients running the client objects;

a meta database for providing persistent storage of cataloged object descriptors for object classes in the distributed-object client-server application;

a meta server, coupled to the meta database, for receiving change requests, the meta server reading object descriptors from the meta database and writing modified and new object descriptors to the meta database in response to the change requests, the meta server cataloging object descriptors;

a compiler, coupled to the meta server, for compiling the modified and new object descriptors from the meta server, the compiler outputting newly-compiled class definitions;

an object adaptor, receiving the newly-compiled class definitions, for creating new server objects and new client objects using the newly-compiled class definitions, the object adaptor invalidating obsolete objects on the server and on the plurality of remote clients, the obsolete objects made obsolete by the change requests; and wherein other server objects and other client objects continue to run while the object adaptor invalidates the obsolete objects and creates the new server objects and the new client objects, an application database on the server, containing data used by the distributed-object client-server application, the application database read and written by server objects in response to requests by client objects;

wherein the meta server includes structure-update means for updating field definitions in the application database in response to the change requests, whereby a structure of the application database is changed when the server objects and the client objects are updated and whereby the distributed-object client-server application is updated while running.

2. The run-time object-updating system of claim 1 further comprising:

a user interface for defining changes to the distributed-object client-server application, the user interface running on a remote client in the plurality of remote clients;

a request generator, coupled to the user interface, for generating the change requests by sending change commands to the meta server, whereby the distributed-object client-server application is modified by the user interface running on the remote client.

3. The run-time object-updating system of claim 2 wherein the meta server catalogs object descriptors for client objects and for server objects, wherein the meta server catalogs object descriptors for both the server and the plurality of remote clients.

4. The run-time object-updating system of claim 3 wherein the meta server catalogs all object descriptors for all server objects and all client objects,
whereby the meta server generates a complete catalog of all distributed objects for the distributed-object client-server application.

5. A run-time object-updating system for updating a distributed-object client-server application having client objects and server objects, the run-time object-updating system comprising:
  a network connection on a server running the server objects, the network connection for transmitting and receiving packets from a plurality of remote clients running the client objects;
  a meta database for providing persistent storage of cataloged object descriptors for object classes in the distributed-object client-server application;
  a meta server, coupled to the meta database, for receiving change requests, the meta server reading object descriptors from the meta database and writing modified and new object descriptors to the meta database in response to the change requests, the meta server cataloging object descriptors;
  a compiler, coupled to the meta server, for compiling the modified and new object descriptors from the meta server, the compiler outputting newly-compiled class definitions;
  an object adaptor, receiving the newly-compiled class definitions, for creating new server objects and new client objects using the newly-compiled class definitions, the object adaptor invalidating obsolete objects on the server and on the plurality of remote clients, the obsolete objects made obsolete by the change requests; and
  wherein other server objects and other client objects continue to run while the object adaptor invalidates the obsolete objects and creates the new server objects and the new client objects,
  wherein the server is a single server and the distributed-object client-server application is a single application, wherein a redundant server and a redundant distributed-object client-server application are not used,
whereby the distributed-object client-server application is updated while running and whereby redundant hardware and software are not needed.

6. A run-time object-updating system for updating a distributed-object client-server application having client objects and server objects, the run-time object-updating system comprising:
  a network connection on a server running the server objects, the network connection for transmitting and receiving packets from a plurality of remote clients running the client objects;
  a meta database for providing persistent storage of cataloged object descriptors for object classes in the distributed-object client-server application;
  a meta server, coupled to the meta database, for receiving change requests, the meta server reading object descriptors from the meta database and writing modified and new object descriptors to the meta database in response to the change requests, the meta server cataloging object descriptors;
  a compiler, coupled to the meta server, for compiling the modified and new object descriptors from the meta server, the compiler outputting newly-compiled class definitions;
  an object adaptor, receiving the newly-compiled class definitions, for creating new server objects and new client objects using the newly-compiled class definitions, the object adaptor invalidating obsolete objects on the server and on the plurality of remote clients, the obsolete objects made obsolete by the change requests; and
  wherein other server objects and other client objects continue to run while the object adaptor invalidates the obsolete objects and creates the new server objects and the new client objects,
  client caches on each client in the plurality of remote clients, the client caches storing copies of recently-used class definitions;
  cache invalidation means, in the object adaptor, for invalidating copies of the obsolete objects by invalidating obsolete class definitions indexed by the client caches,
whereby the distributed-object client-server application is updated while running and whereby obsolete client objects are invalidated through the client caches.

7. A run-time object-updating system for updating a distributed-object client-server application having client objects and server objects, the run-time object-updating system comprising:
  a network connection on a server running the server objects, the network connection for transmitting and receiving packets from a plurality of remote clients running the client objects;
  a meta database for providing persistent storage of cataloged object descriptors for object classes in the distributed-object client-server application;
  a meta server, coupled to the meta database, for receiving change requests, the meta server reading object descriptors from the meta database and writing modified and new object descriptors to the meta database in response to the change requests, the meta server cataloging object descriptors;
  a compiler, coupled to the meta server, for compiling the modified and new object descriptors from the meta server, the compiler outputting newly-compiled class definitions;
  an object adaptor, receiving the newly-compiled class definitions, for creating new server objects and new client objects using the newly-compiled class definitions, the object adaptor invalidating obsolete objects on the server and on the plurality of remote clients, the obsolete objects made obsolete by the change requests; and
  wherein other server objects and other client objects continue to run while the object adaptor invalidates the obsolete objects and creates the new server objects and the new client objects,
  client caches on each client in the plurality of remote clients, the client caches storing copies of recently-used client objects;
  cache invalidation means, in the object adaptor, for invalidating copies of the obsolete objects by invalidating obsolete client objects indexed by the client caches,
whereby the distributed-object client-server application is updated while running and whereby obsolete client objects are invalidated through the client caches.

8. A computer-implemented method for updating a running distributed-object client-server application, the method comprising:
  accepting user-defined changes to the running distributed-object client-server application and generating change commands from the user-defined changes;

reading object-descriptor code from a meta server;

modifying the object-descriptor code to generate updated object-descriptor code;

compiling and linking the updated object-descriptor code;

creating updated server objects from the updated object-descriptor code;

loading the updated server objects to a server running a server side of the distributed-object client-server application and processing new client requests from client objects with the updated server objects and not obsolete server objects;

marking the obsolete server objects as invalid when the updated server objects are loaded, but continuing to process existing client requests submitted before the updated server objects are loaded with the obsolete server objects marked as invalid;

removing the obsolete server objects when the existing client requests are completed;

after the obsolete server objects are removed:

creating updated client objects from the updated object-descriptor code;

loading the updated client objects to a client running a client side of the distributed-object client-client application and processing new user requests from client objects with the updated client objects and not obsolete client objects;

marking the obsolete client objects as invalid when the updated client objects are loaded, but continuing to process existing user requests submitted before the updated client objects are loaded with the obsolete client objects marked as invalid; and removing the obsolete client objects when the existing user requests are completed, wherein removing the obsolete client objects comprises removing each obsolete client object when a reference count for the obsolete client object reaches zero references, whereby the running distributed-object client-server application is not stopped for updating the client objects and the server objects.

9. A computer-implemented method for updating a running distributed-object client-server application, the method comprising:

accepting user-defined changes to the running distributed-object client-server application and generating change commands from the user-defined changes;

reading object-descriptor code from a meta server;

modifying the object-descriptor code to generate updated object-descriptor code;

compiling and linking the updated object-descriptor code;

creating updated server objects from the updated object-descriptor code;

loading the updated server objects to a server running a server side of the distributed-object client-server application and processing new client requests from client objects with the updated server objects and not obsolete server objects;

marking the obsolete server objects as invalid when the updated server objects are loaded, but continuing to process existing client requests submitted before the updated server objects are loaded with the obsolete server objects marked as invalid;

removing the obsolete server objects when the existing client requests are completed;

after the obsolete server objects are removed:

creating updated client objects from the updated object-descriptor code;

loading the updated client objects to a client running a client side of the distributed-object client-client application and processing new user requests from client objects with the updated client objects and not obsolete client objects;

marking the obsolete client objects as invalid when the updated client objects are loaded, but continuing to process existing user requests submitted before the updated client objects are loaded with the obsolete client objects marked as invalid; and removing the obsolete client objects when the existing user requests are completed, transmitting an error message from an updated server object to an obsolete client object when the obsolete client object requests an operation that has been updated; and re-loading an object instance of the obsolete client object with the updated client object when the error message is received, whereby the running distributed-object client-server application is not stopped for updating the client objects and the server objects and whereby the object instance is re-loaded with the updated client object in response to the error message.

10. A computer-implemented method for updating a running distributed-object client-server application, the method comprising:

accepting user-defined changes to the running distributed-object client-server application and generating change commands from the user-defined changes;

reading object-descriptor code from a meta server;

modifying the object-descriptor code to generate updated object-descriptor code;

compiling and linking the updated object-descriptor code;

creating updated server objects from the updated object-descriptor code;

loading the updated server objects to a server running a server side of the distributed-object client-server application and processing new client requests from client objects with the updated server objects and not obsolete server objects;

marking the obsolete server objects as invalid when the updated server objects are loaded, but continuing to process existing client requests submitted before the updated server objects are loaded with the obsolete server objects marked as invalid;

removing the obsolete server objects when the existing client requests are completed;

after the obsolete server objects are removed:

creating updated client objects from the updated object-descriptor code;

loading the updated client objects to a client running a client side of the distributed-object client-client application and processing new user requests from client objects with the updated client objects and not obsolete client objects;

marking the obsolete client objects as invalid when the updated client objects are loaded, but continuing to process existing user requests submitted before the updated client objects are loaded with the obsolete client objects marked as invalid; and removing the obsolete client objects when the existing user requests are completed, updating an application database by adding, deleting, or modifying fields indicated by the change commands from the user-defined changes, wherein the application database is changed before the updated server objects are loaded, whereby the running distributed-object client-server application is not stopped for updating the client objects and the server objects.

11. A computer-program product comprising:

a computer-usable medium having computer-readable program code means embodied therein for updating a distributed application, the computer-readable program code means in the computer-program product comprising:

network connection means for transmitting and receiving packets from clients to a server;

meta database means for storing client object descriptors and server object descriptors;

meta server means for updating the client object descriptors and server object descriptors stored in the meta database to process application change requests;

adaptor means, responsive to the meta server means, for installing updated server objects on the server and installing updated client objects on the clients, the adaptor means also for removing obsolete objects on the clients and on the server; and application database means, on the server, for storing data used by the distributed application, the application database means being read and written by server objects in response to requests by client objects;

wherein the meta server means includes structure-update means for updating field definitions in the application database means in response to the application change requests, whereby a structure of the application database means is changed when the server objects and the client objects are updated and whereby the distributed application is updated without halting other server objects and other client objects when the updated server objects and the updated client objects are installed and obsolete object removed.

12. The computer-program product of claim 11 wherein the computer-readable program code means further comprises:

compiler means, coupled to the meta server means, for compiling and linking client object descriptors and server object descriptors updated by the meta server means, the compiler means outputting the updated client objects and the updated server objects as compiled objects to the adaptor means for installation on the server and on the clients, whereby changes are compiled and installed.

13. A computer-program product comprising:

a computer-usable medium having computer-readable program code means embodied therein for updating a distributed application, the computer-readable program code means in the computer-program product comprising:

network connection means for transmitting and receiving packets from clients to a server;

meta database means for storing client object descriptors and server object descriptors;

meta server means for updating the client object descriptors and server object descriptors stored in the meta database to process application change requests;

adaptor means, responsive to the meta server means, for installing updated server objects on the server and installing updated client objects on the clients, the adaptor means also for removing obsolete objects on the clients and on the server;

user interface means for defining changes to the distributed application, the user interface means running on a remote client; and a request generator, coupled to the user interface means, for generating the application change request by sending change commands over the network connection means to the meta server means, whereby the distributed application is updated without halting other server objects and other client objects when the updated server objects and the updated client objects are installed and obsolete object removed and whereby the distributed application is modified by the user interface means running on the remote client.

14. The computer-program product of claim 13 wherein the computer-readable program code means further comprises:

invalidation means, for invalidating the obsolete objects when the updated client objects are installed, wherein new requests from other objects are sent to the updated client objects while existing requests continue to be processed by the obsolete objects after invalidation;

object deleting means for deleting the obsolete objects when the existing requests have completed processing, whereby the obsolete objects continue operation for a period of time after the updated objects are installed.

15. A computer-program product comprising:

computer-usable medium having computer-readable program code means embodied therein for updating a distributed application, the computer-readable program code means in the computer-program product comprising:

network connection means for transmitting and receiving packets from clients to a server;

meta database means for storing client object descriptors and server object descriptors;

meta server means for updating the client object descriptors and server object descriptors stored in the meta database to process application change requests;

adaptor means, responsive to the meta server means, for installing updated server objects on the server and installing updated client objects on the clients, the adaptor means also for removing obsolete objects on the clients and on the server;

wherein the server is a single server and the distributed application is a single application, wherein a redundant server and a redundant distributed-object client-server application are not used, whereby the distributed application is updated without halting other server objects and other client objects when the updated server objects and the updated client objects are installed and obsolete object removed and whereby redundant hardware and software are not needed.

16. The computer-program product of claim 15 wherein the network connection means comprises Distributed Component Object Model (DCOM) or Common Object Request Broker Architecture (CORBA) middle-ware using proxy and stub objects for object communication over a network.

* * * * *